3,256,351
CONVERSION OF o-NITROCHLOROBENZENE TO o-DICHLOROBENZENE
Robert Ira Leib, Kirkwood, Mo., assignor to Monsanto Company, a corporation of Delaware
No Drawing. Filed Aug. 22, 1963, Ser. No. 303,937
2 Claims. (Cl. 260—650)

This invention relates to a novel process for the production of dichlorobenzene. More particularly, this invention relates to a process for converting o-nitrochlorobenzene to o-dichlorobenzene.

It has been proposed to react a selected nitrochlorobenzene with a metal halide, such as aluminum chloride, to replace the nitro substituent with chlorine and obtain the corresponding dichlorobenzene. However, efforts to react nitrochlorobenzene with a metal halide resulted in the formation of tarry materials and unchanged nitrochlorobenzene.

It has been found that the nitro group in nitrochlorobenzene can be replaced with a chloride ion by reacting nitrochlorobenzene with a selected metal halide and a selected complexing agent to yield the corresponding dichlorobenzene. Thus, the ortho-, meta-, and para-nitrochlorobenzenes can be reacted with a chlorine-containing compound to yield respectively, the corresponding ortho-, meta-, and para-dichlorobenzene.

It is therefore an object of this invention to provide a process for direct chlorine replacement of the nitro group in nitrochlorobenzene.

Another object of this invention is to provide a process to convert o-nitrochlorobenzene to o-dichlorobenzene.

Other objects will appear hereinafter.

According to the present invention, a dichlorobenzene can be prepared from its corresponding nitrochlorobenzene by heating at a temperature of from about 200° to 250° C., preferably from 225° to 240° C., the nitrochlorobenzene with a complex salt formed between a metal halide and a complexing agent. The complex salt may be prepared prior to the addition of the nitrochlorobenzene or may be formed in situ by adding the reactants, in any sequence, to the reaction vessel. As the reaction proceeds, nitrogen oxide gases are liberated evidencing the replacement of the aromatic nitro group.

The expression "metal halide" is used herein to denote the chloride of aluminum or copper. The term "complexing agent" is used herein to denote pyridine, quinoline, isoquinoline, and alkali metal chlorides that form complex compounds with aluminum chloride, such as potassium and sodium chloride. It is preferred that the metal halide and the complexing agent be added in substantially equal molar quantities and that the molar ratio of the complexing agent to the nitrochlorobenzene is less than 1:1.

The details of the reaction will be more fully understood by reference to the following examples. These examples set forth representative starting materials, quantities of reactants, and reaction conditions. It should be emphasized that such examples are not to be construed as limiting the scope of this invention, but are solely for the purpose of illustration.

*Example I*

In a suitable reaction vessel equipped with a reflux condenser and mechanical stirring device, there is added 161.7 grams (1.03 mol) of o-nitrochlorobenzene, 27.9 grams (0.21 mole) of aluminum chloride, and 14.8 grams (0.20 mole) of anhydrous potassium chloride. The mixture is heated, with stirring, to about 225 to 230° C., at which time there is evolution of nitrogen oxides and refluxing commences. The heating is stopped, and the reflux condenser is replaced with a short column and a condenser. The heating is again started and continued until a temperature of about 239° C., is attained, at which time the low-boiling material is completely distilled. The distillate is washed successively with water, dilute sodium carbonate, and finally with water. There is obtained 23.5 grams of material comprising principally o-dichlorobenzene and unreacted o-nitrochlorobenzene.

*Example II*

To a reaction vessel as set forth in Example I, there is added 200.1 grams (1.27 mole) of o-nitrochlorobenzene, 58 grams (1.0 mole) of anhydrous sodium chloride, and 133.5 grams (1.0 mole) of aluminum chloride. Following the procedure set forth in Example I, there is obtained, as the low-boiling distillate, o-dichlorobenzene in good yield.

While this invention has been described with respect to certain embodiments, it is not so limited, and it is to be understood that variations and modifications thereof obvious to those skilled in the art may be made without departing from the spirit and scope of the appended claims.

The embodiments of the invention in which an exclusive property or privilege is claimed are defined as follows:

1. A process which comprises reacting at a temperature of from about 200 to 250° C. nitrochlorobenzene with a compound having the formula $AlCl_3 \cdot Y$ where Y is selected from the group consisting of potassium chloride and sodium chloride.

2. A process which comprises reacting at a temperature of from about 225 to 230° C. nitrochlorobenzene with $AlCl_3 \cdot KCl$ complex.

References Cited by the Examiner

Arganbright et al., "J. of Org. Chem.," Vol. 27, pp. 1205–8 (1962).
Beilstein, "Organische Chemie," Vol. 5, p. 320 (1918).
Holleman, "Trav. Chim. Pays-Bas," Vol. 31, pp. 267–280 (1912).
Menzel et al., "Ber.," Vol. 75, pp. 1055–61 (1942).
Thomas, "Anhydrous Aluminum Chloride in Org. Chem.," pp. 25 and 53 (1950).

LEON ZITVER, *Primary Examiner.*